(12) United States Patent
Fuente

(10) Patent No.: US 6,519,677 B1
(45) Date of Patent: Feb. 11, 2003

(54) MANAGING ACCESS TO SHARED DATA IN DATA PROCESSING NETWORKS

(75) Inventor: Carlos Francisco Fuente, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/295,734

(22) Filed: Apr. 20, 1999

(51) Int. Cl.$^7$ ............................................. G06F 13/00
(52) U.S. Cl. ........................ 711/112; 711/113; 711/114; 711/147; 714/6
(58) Field of Search .................................. 711/112, 114, 711/147, 152, 113; 714/6; 710/240, 242

(56) References Cited

U.S. PATENT DOCUMENTS

| | | | |
|---|---|---|---|
| 4,135,240 A | * | 1/1979 | Ritchie ........................ 711/164 |
| 5,574,882 A | * | 11/1996 | Menon et al. ............... 711/114 |
| 5,890,217 A | * | 3/1999 | Kabemoto et al. ........... 711/141 |
| 6,073,218 A | * | 6/2000 | DeKoning et al. ........... 711/114 |
| 6,151,659 A | * | 11/2000 | Solomon et al. ............. 711/114 |
| 6,332,197 B1 | * | 12/2001 | Jadav et al. .................... 714/6 |

FOREIGN PATENT DOCUMENTS

WO   WO 98/28685   7/1998

* cited by examiner

Primary Examiner—Do Hyun Yoo
Assistant Examiner—Yamir Encarnación
(74) Attorney, Agent, or Firm—Abdy Raissinia; Bracewell & Patterson, L.L.P.

(57) ABSTRACT

In a data processing network including a plurality of array controllers connected for communication to each other and a plurality of data storage devices, a method for coordinating exclusive write access by the plurality of controllers to a shared data region on said plurality of data storage devices comprising the steps of: at a first array controller, broadcasting an exclusive access request to all other array controllers having access to the shared data region and storing a non-volatile record of the write operation in the first controller; and at each controller receiving the exclusive access request, storing a non-volatile record of the write operation prior to sending an exclusive access grant to the first controller.

9 Claims, 7 Drawing Sheets

MANAGING ACCESS TO SHARED DATA IN DATA PROCESSING NETWORKS

FIELD OF THE INVENTION

The present invention relates generally to a method and apparatus for managing access to shared data in data processing networks.

BACKGROUND OF THE INVENTION

Many of today's mid to high-end computer systems (for example network servers and workstations) include mass storage devices configured as a redundant array in order to provide fast access to data stored on the devices and also to provide for data backup in the event of a device failure. These arrays are commonly made up of a number of magnetic disk storage devices, which are held in an enclosure and connected to the host system by an array controller unit which may take the form of either an array adapter located within the main processing unit of the computer system or alternatively a standalone array controller connected to the main processing unit. The interface between the main processing unit and the array often takes the form of one of the popular industry-standard protocols such as SCSI (Small Computer Systems Interface) or SSA (Serial Storage Architecture). In the following, the term 'controller' will be used to encompass both array adapters and outboard controllers.

Storage arrays of this type are commonly arranged according to one or more of the five architectures (levels) set out by the RAID advisory board. Details of these levels can be found in various documentation including in the 'RAID book' (ISBN 1-57398-028-5) published by the RAID advisory board. Three of these architectures (RAID levels 3,4 and 5) are known as parity RAID because they all share a common data protection mechanism. Two of the parity RAID levels (4 and 5) are independent access parity schemes wherein a data stripe is made up of a number of data strips or blocks and a parity strip. Each data strip is stored on one member disk of the array. In RAID level 4, the parity strips are all stored on one member of the array. In RAID level 5, the parity strips are distributed across the member disks. In contrast with the parallel access schemes, an application I/O request in an independent access array may require access to only one member disk.

To further improve reliability of the overall storage system, it is known to employ redundant controllers to provide ongoing access to data in the event one of the controllers fails. In some such architectures, one of the controllers is provided to control data transfer to and from the array of disks and the other controller is provided only as back-up in the event of failure of the main controller. Such an arrangement is wasteful of processing power.

In another, more sophisticated system, described in WO98/28685, a RAID storage subsystem comprises a plurality of controllers connected for communication with an array of disk storage devices. One of the plurality of controllers is designated as a primary controller with respect to a particular RAID logical unit (LUN) of the RAID subsystem. The primary controller is responsible for fairly sharing access to the common disk drives of the LUN among all the requesting RAID controllers. A controller desiring access to the shared disk drives of the LUN sends a message to the primary controller requesting an exclusive temporary lock of the relevant stripes of the LUN. The primary controller returns a grant of the requested lock when such exclusivity is permissible. The requesting controller then performs any required I/O operations to the shared devices and transmits a lock release to the primary controller when the operations have completed. In the event of a failure of a primary controller, another controller is described as being assigned to take its place.

The designation of one of the controllers as a primary controller has the advantage of providing a centralized mechanism for permitting exclusive access to the array. However such an arrangement has the disadvantage that it places an extra burden on the processing power of the primary controller, which may result in an imbalance in the work done by each controller. In addition, in the event of a failure of the primary controller, the work required to pass control to a replacement primary controller could be significant. Furthermore, if the primary controller were to fail while executing an I/O operation, then none of the other controllers would have knowledge of the state of that operation. In this situation, the only recourse would be to rebuild the entire array, which could lead to data loss.

Thus in data storage arrays in which a plurality of controllers are connected to a common shared array of storage devices, it would be desirable to provide a mechanism for allowing shared access to the devices which avoids some or all of the aforementioned disadvantages.

SUMMARY OF THE INVENTION

In order to address the above described deficiencies in the prior art, it is an object of the present invention to provide a mechanism that allows for shared access to storage devices by coordinating exclusive access to the storage devices.

According to a first aspect of the invention therefore, there is provided, in a data processing network including a plurality of array controllers connected for communication to each other and a plurality of data storage devices, a method for coordinating exclusive access by the plurality of controllers to a shared data region on said plurality of data storage devices. The method comprises the steps of: for each write operation to the shared data region, sending an exclusive access request from a controller desiring such access to all controllers having access to the shared data region; and, as part of granting exclusive access to the requesting controller, storing a non-volatile record of the write operation in each of the plurality of controllers having access to the shared data region.

When viewed from a second aspect the method comprises the steps of: at a first array controller, broadcasting an exclusive access request to all other array controllers having access to the shared data region and storing a non-volatile record of the write operation in the first controller; and at each controller receiving the exclusive access request, storing a non-volatile record of the write operation prior to sending an exclusive access grant to the first controller.

Thus in contrast with the technique disclosed in WO98/28685, a method for coordinating access is provided which does not involve assigning one of the controllers as a primary controller and sending all exclusive access requests to the primary controller. In accordance with the present invention, each controller is a peer and equivalent to all other controllers and if it requires exclusive access, it sends a request to all controllers on the network. Those controllers which share access to the affected region then grant access to the requesting controller. Furthermore, each controller makes a non-volatile record (e.g. parity in doubt in the case of RAID 5 I/O) of the operation which allows the regeneration of parity data in the event that there is a power failure to the adapters.

Furthermore, the present invention avoids the aforementioned problem inherent in the technique of WO98/28685, when a RAID 5 I/O is performed by the master controller. In this prior art, the primary controller does not communicate details of the I/O to another controller. Thus if the primary controller should fail then no other controller has knowledge of what I/O the old primary was performing. In the present invention, there is no primary controller and information on the RAID 5 I/O operations on each controller are communicated to the other controllers.

A preferred embodiment of the present invention will now be described, by way of example only, with reference to the accompanying drawings.

DESCRIPTION OF THE PREFERRED EMBODIMENT

The invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage devices such as fixed (hard) drives, diskettes, optical disks, magnetic tape, semiconductor memories such as ROMS, PROMs, etc., thereby making an article of manufacture according to the invention. The article of manufacture containing the computer programming code is used by either executing the code directly from the storage device, by copying the code from the storage device into another storage device such as a hard disk, RAM, etc. or by transmitting the code on a network for remote execution. The method form of the invention may be practiced by combining one or more machine readable storage devices containing the code according to the invention with appropriate standard computer hardware to execute the code contained therein. An apparatus for practicing the invention could be one or more computers and storage systems containing or having network access to computer programming code according to the invention.

Figure 1:
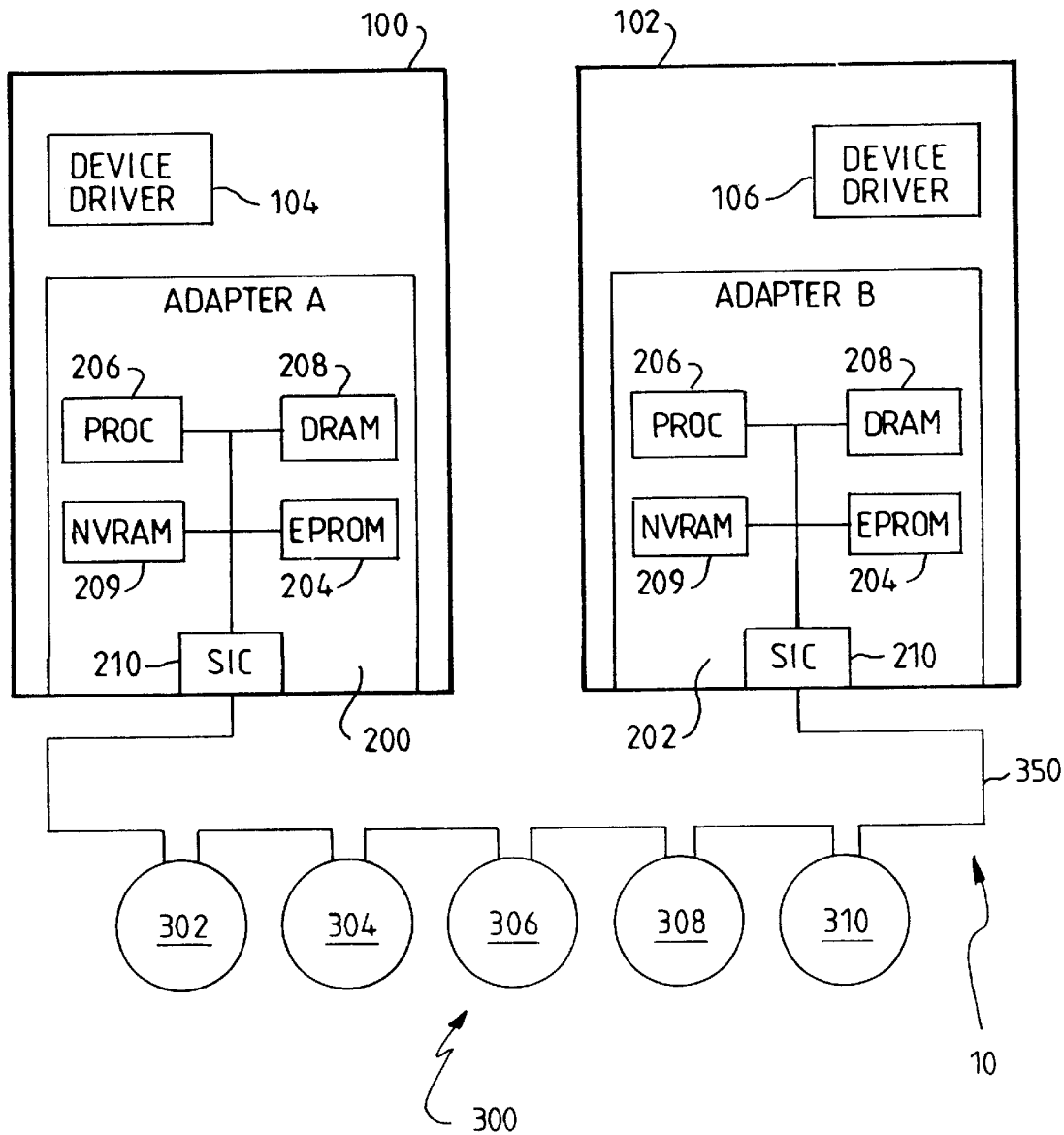
FIG. 1 is a block diagram of a data processing network comprising two host systems connected to a shared common array of storage devices by means of device adapters.

With reference first to FIG. 1, there is shown a data processing network 10 comprising two host computer systems (100, 102), device drivers (104, 106) and device adapters A and B (200, 202). The host computer systems may be personal computers, workstations, mainframes and the like. In accordance with the preferred embodiment, the device adapters take the form of a card which is mounted in a slot within the host system and is logically connected to the host system via a system bus such as a PCI or MCA bus. A suitable device adapter is the IBM SSA RAID Enhanced Adapter (available from IBM Corporation). Each device adapter is connected for communication to a storage subsystem 300, comprising a string of disk storage devices 302,304,306,308,310 by means of a serial link 350 that is configured according to the Serial Storage Architecture (SSA). The disk storage devices are shared between the adapter/host pairs 100/200 and 102/202 such that each host can read or write data to and from each shared device.

Adapter A and Adapter B each include an EPROM 204 for storing adapter microcode that executes on a microprocessor 206 to provide storage subsystem management services (e.g. services to configure the storage devices as an array) for the host system. The adapter further includes memory in the form of DRAM 208 into which the microcode is loaded on initialisation of the adapter to give the microprocessor rapid access to the microcode. DRAM 208 is also used to cache data during RAID-5 operations. Also provided in each adapter is non-volatile memory (NVRAM-209) that is used to keep a record of write operations in progress in the system. Communication logic in the form of a Serial Interface Chip (SIC) 210 is provided in each adapter to provide communication with the disk storage devices and the attached adapter via the Serial Link 350.

In the present embodiment, the host device drivers and adapters communicate by means of a logical client-server network called the Independent Packet Network (IPN). Details of SSA and IPN may be found in the IBM publication PCI SSA RAID Adapters, IBM Publication Number SA33-3225-02, which is hereby incorporated by reference. IPN is a logical network of services which in the present embodiment are implemented as part of the adapter microcode held in EPROM 204. A client, such as a host device driver, can access a service (e.g. in the adapter) by specifying its address in the IPN network, without being concerned where the service is physically located. The unit of work in IPN is a transaction. The routing layer of IPN establishes a connection between the client and the service for the duration of each transaction. An IPN node is a hardware unit that runs the IPN kernel; in the present embodiment, the host systems and adapters are examples of IPN nodes. The adapter provides a number of IPN services including a disk service to give basic read/write access to each attached disk drive and various RAID services. Nodes are connected together across hardware interfaces via gateways.

Figure 2:
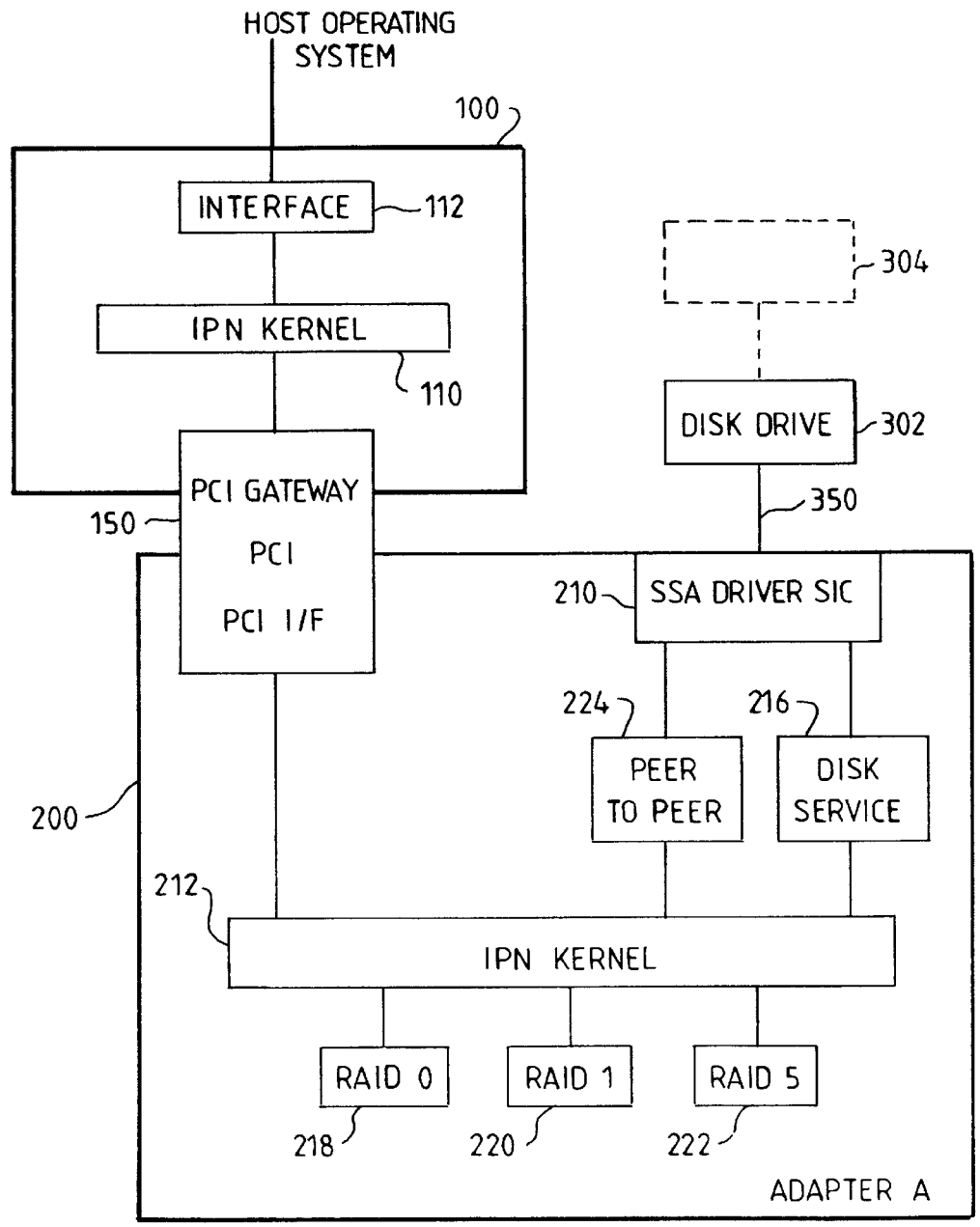
FIG. 2 is a block diagram of one of the host systems and device adapters of FIG. 1 showing the adapter logic implementing the preferred embodiment of the present invention.

With reference to FIG. 2, there is shown a schematic representation of the IPN components in one of the host/adapter pairs of FIG. 1. The host 100 includes an IPN kernel 110 and an interface 112 to the host operating system. Connecting the adapter and host system is a Gateway 150 which is used to cross the physical PCI interface.

In the present embodiment, the adapter IPN services are implemented as program code which, as described above, is stored in the EPROM. The adapter 200 includes an IPN kernel 212 and a variety of IPN services including a Disk Service 216 and RAID0 218, RAID1 220 and RAID5 222 services. A Peer to Peer communication facility 224 is also provided which is used in the present embodiment to facilitate communication between adapter A and adapter B. Finally, an SSA Driver 210 is provided with the SIC chip to control communication with the disk drives.

In the following description, the disk array is configured according to level 5 of the RAID scheme i.e. as an independent access RAID array with distributed parity. It will be appreciated however that the present invention is useful with other array configurations (e.g. RAID 1, RAID 3 and RAID 4) where regions of the storage devices are shared between adapters. The RAID level 5 array employed in the present embodiment comprises all five disks of the array. Data is stored on the array in stripes wherein a stripe comprises four blocks or strips of user data, each block being stored on a different disk (e.g. disks 302 to 308), and a parity block which is stored on a fifth disk (e.g. disk 310). The block size may be of any desired size e.g. byte, sector or multi-sector. In accordance with RAID level 5, the parity blocks of different stripes are stored on different disks.

A typical Transaction to read from a RAID-5 array is processed as described below.

1. The host device driver 112 generates the IPN Transaction. The device driver calls the host IPN kernel 110 with a pointer to a Master Control Block (MCB) for the Transaction. The MCB is addressed to the RAID5 Service 216 in the adapter.
2. The host IPN kernel 110 calls the PCI Gateway 150 with a pointer to the MCB.
3. The host side of the PCI Gateway creates a Gateway Transaction Control Block (GTCB) in host memory. Each GTCB has a pointer to the next GTCB to form a chain of GTCBs. The PCI Gateway interrupts the adapter when a new GTCB has been set up.
4. The adapter side of the PCI Gateway uses the PCI Interface chip to fetch the GTCB by DMA. The Gateway 150 then creates a Transaction Control Block (TCB) in the adapter address space. Finally the Gateway 150 calls the adapter IPN kernel 212 to submit the TCB.
5. The adapter IPN kernel calls the RAID-5 service for the addressed resource with a pointer to the TCB.
6. The RAID-5 service generates IPN transactions for each of the disk drives and sends these transactions to the Disk Service using the IPN kernel.
7. The Disk Service generates the appropriate SCSI read commands and passes them to the SSA Driver.
8. The SSA Driver issues the SCSI commands to the disk drives using the SSA protocol and the SIC.
9. The disk drives queue the SCSI commands for later execution.
10. When the disk drives offer the requested data, the SSA Driver sets up the SIC to transfer the data to DRAM. Data is transferred to host memory using the PCI interface chip.
11. When the drives return 'Good Completion' Status, the Disk Service calls the adapter IPN kernel with the result of each transaction generated by the RAID-5 service.
12. When all the transactions have completed, the RAID-5 service informs the host that the original read transaction to the array has been completed.

A transaction to write to a RAID-5 array will follow along similar lines to the read operation described above. As a RAID5 write involves a so-called READ-MODIFY-WRITE sequence of I/Os, the RAID-5 service generates a series of Transactions for the Disk Service which then generates the appropriate SCSI Read and Write commands.

Figure 3:
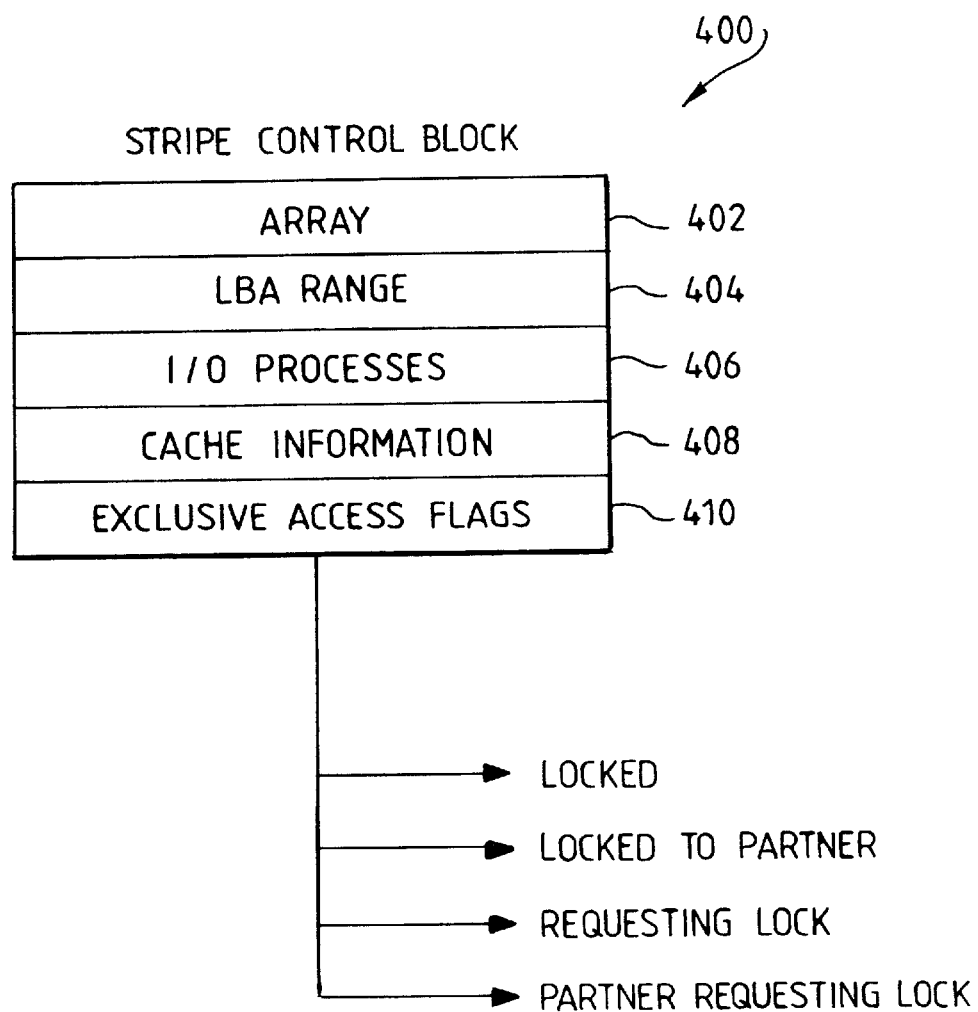
FIG. 3 is an illustration of a Stripe Control Block used in the preferred embodiment of the present invention.

For each RAID 5 operation, the RAID5 service maintains a Stripe Control Block 400 (SCB) of the form shown in FIG. 3. The SCB includes a field 402 identifying the array (the plurality of storage devices may define more than one array), a field 404 identifying the LBA range of the shared region, a field 408 identifying the I/O processes to the shared region, a field including information about data from the shared region which is stored in cache and a field including a set of 'Exclusive Access' flags that are employed in the present invention in coordinating exclusive access to the shared region.

In the following description of the preferred embodiment, each region that is shared between adapters is a stripe of data and the initial, or default, state of a region is that it is accessible for non-exclusive access by both adapter A and adapter B for reads or for using parity to reconstruct data. Either adapter can also cache data that is read from the array. It will be apparent that the implementation is equally applicable to regions of any size provided that the region contains corresponding sectors from each member of the array.

Figure 4:
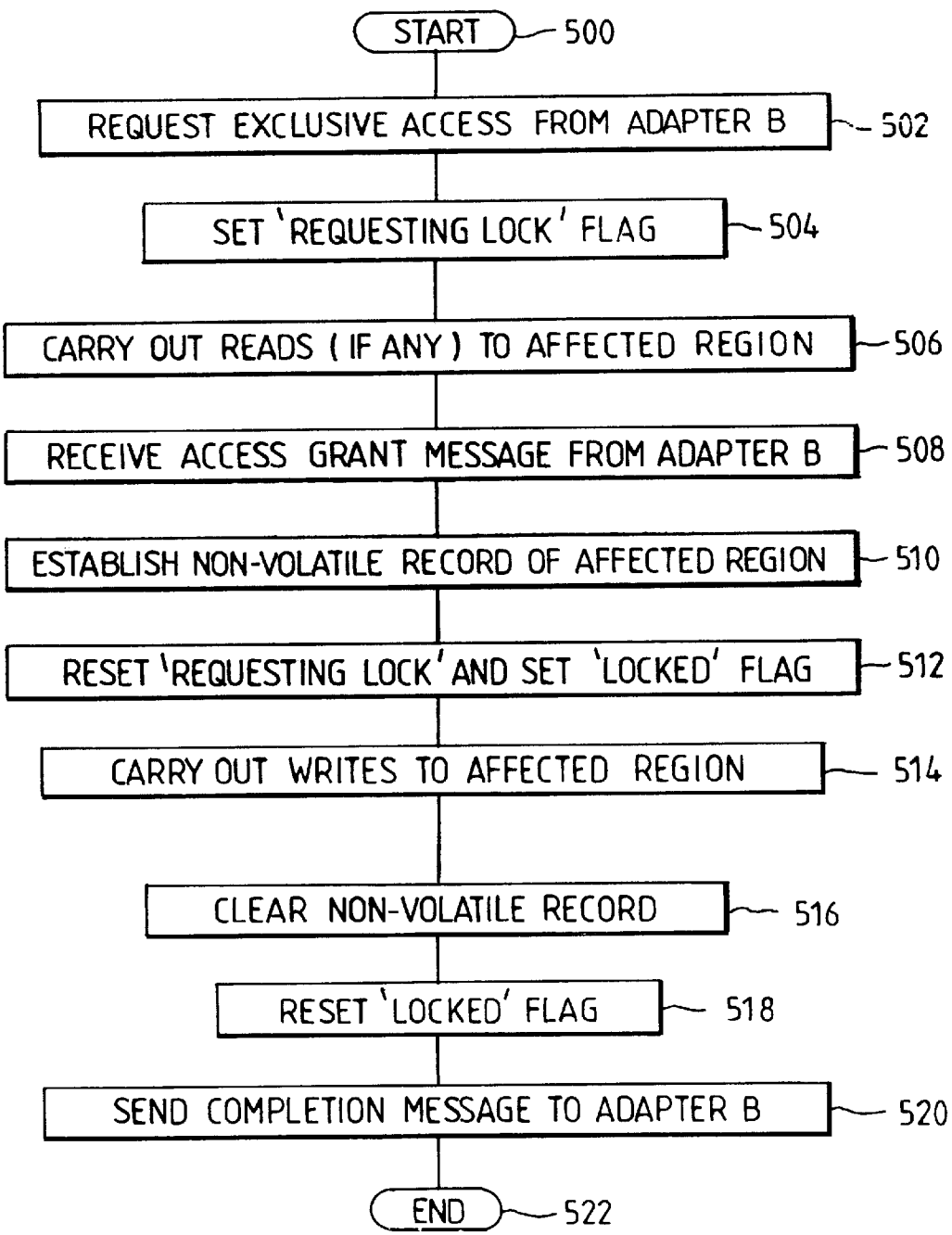
FIG. 4 is a flow chart showing the process steps involved in requesting exclusive access to a shared data region on the data storage devices.
Figure 5:
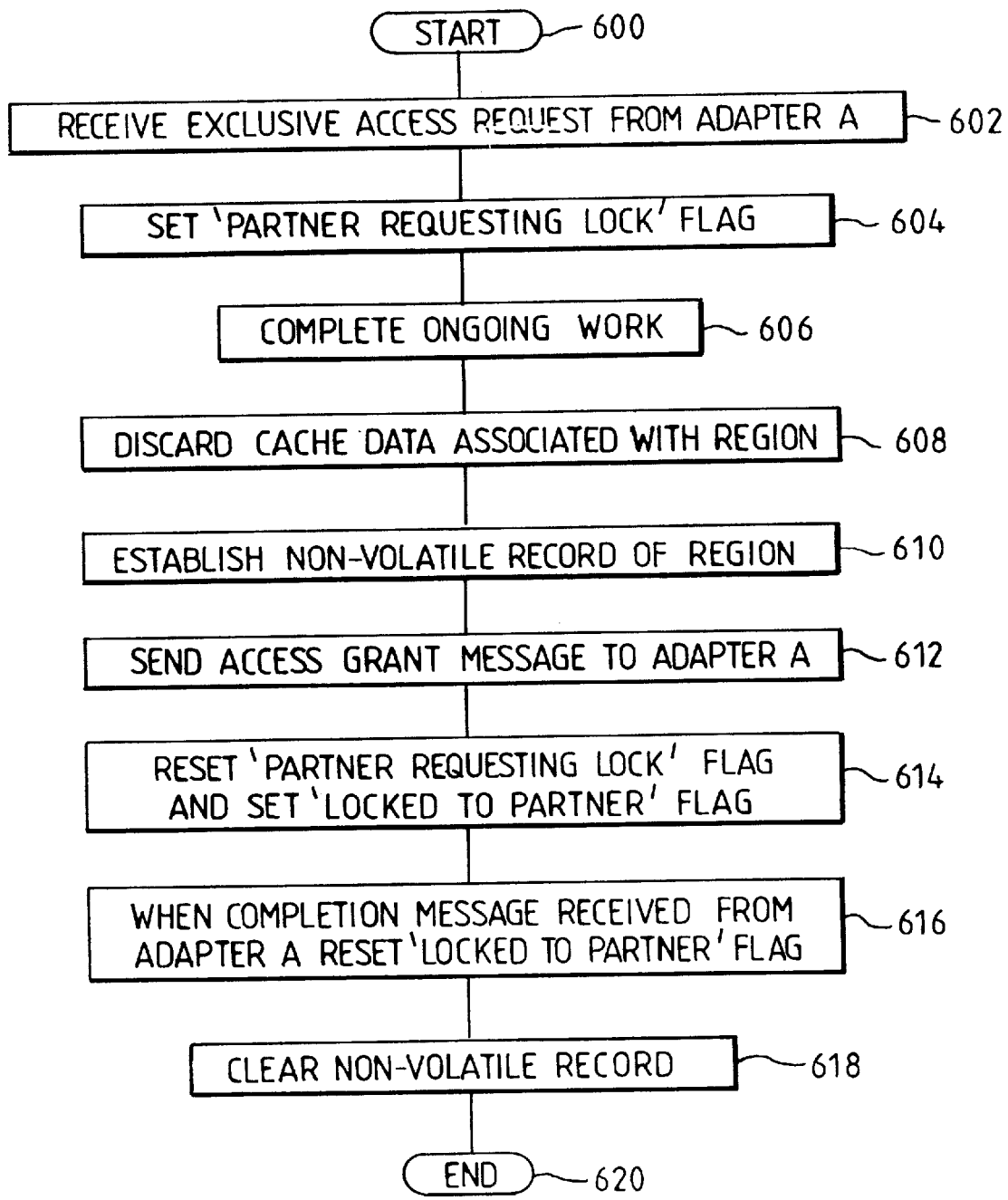
FIG. 5 is a flow chart showing the process steps involved in granting exclusive access to a shared data region on the data storage devices.
Figure 6:
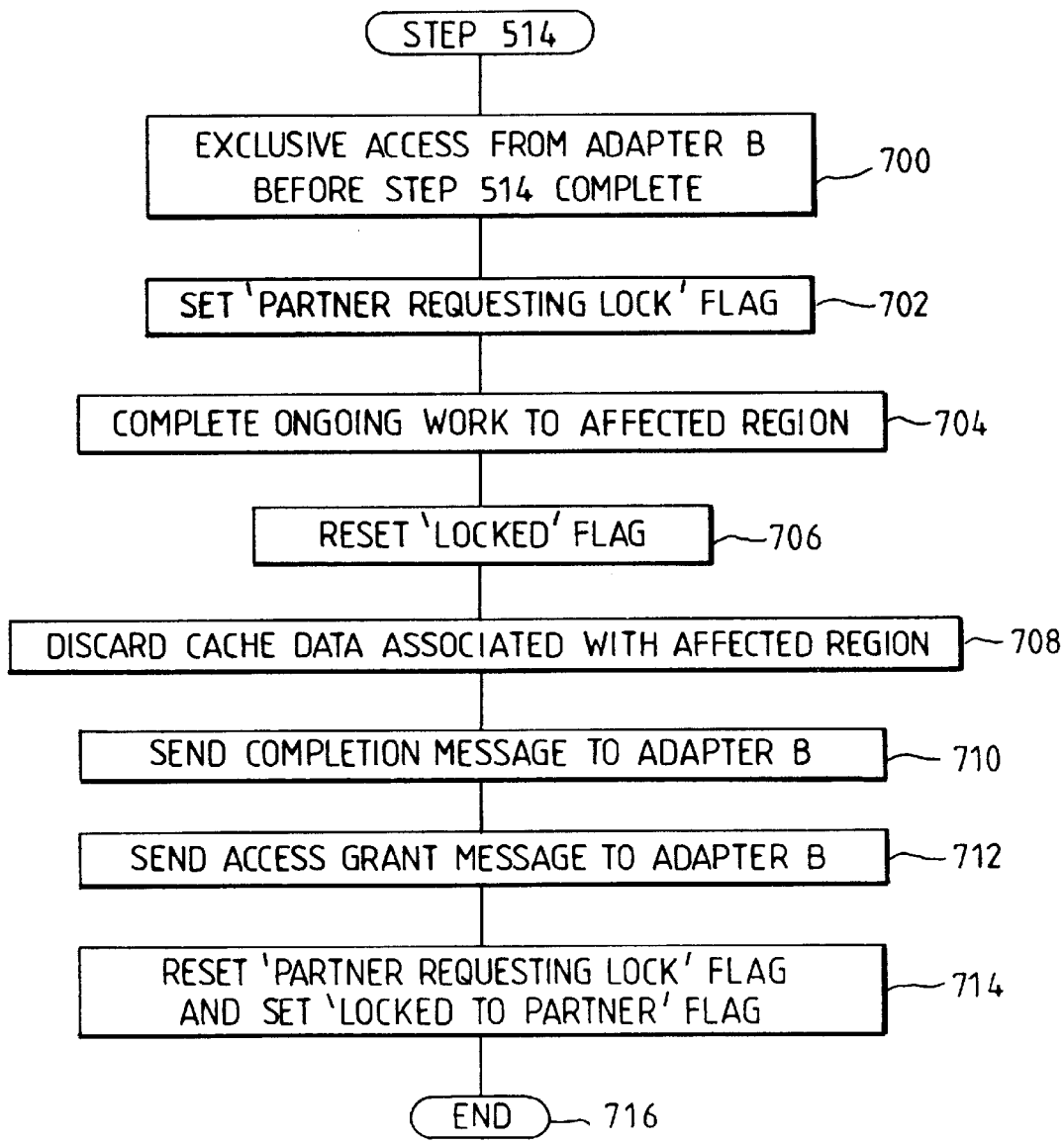
FIG. 6 is a flow chart showing the process steps involved in granting exclusive access during I/O operations to a shared data region.

In order to perform a write operation, an adapter must establish exclusive access to a region. The process steps involved in the requesting and grant of exclusive access to a shared region in a RAID 5 array will now be described with reference to FIGS. 4 to 6. FIG. 4 shows the process steps undertaken at adapter A to request and obtain exclusive access to a region shared with adapter B. FIG. 5 shows the corresponding steps undertaken at adapter B in response to an exclusive access request from adapter A. FIG.6 shows the steps undertaken at adapter A in response to an exclusive access request from adapter B, received while adapter A is accessing the affected region.

The exclusive access. request process begins at step 500 of FIG. 4. On receipt of a Transaction from the host system that involves a write operation to a shared region, the RAID5 service 222 calls the Peer to Peer communication facility 224 to send an Exclusive Access Request message over the serial link 350 to adapter B (step 502). The Exclusive Access Request message includes details of the affected Array and the LBA range for the affected region. The RAID5 service sets the 'Requesting Lock' flag in the Stripe Control Block in DRAM (step 504). While waiting for an Exclusive Access Grant message from adapter B, adapter A is permitted to issue reads (step 506) to the affected region. These can include the reads which are required as part of the RAID 5 write which triggered the request for exclusive access. In this way, the request for exclusive access is overlapped with the read to the disk storage device and does not contribute to any increase in latency for the RAID 5 write operation.

Subsequently, at step 508, adapter A receives an Exclusive Access Grant message from adapter B via the peer to peer communication facility. The Grant message includes ID information of the region and a lock ID. At step 510, the RAID5 service establishes a nonvolatile record (in NVRAM) of the affected region. For a RAID5 write, the record comprises a mark that parity is in doubt for the affected region. At step 512, adapter A resets the 'Requesting Lock' flag and sets the 'Locked' flag in the Stripe Control Block. At this point adapter A has exclusive access to the region and, at step 514, performs the required write operations using the Disk Service 216. On successful completion of the write operations, adapter A restores the region to its default state: the RAID 5 service clears the nonvolatile record in NVRAM (step 516) and resets the 'Locked' flag (step 518). The RAID 5 service then causes the Peer to Peer communication facility to send a Completion message over the serial link to inform adapter B of the end of the write activity (step 520). The process of FIG. 4 ends at step 522.

As previously indicated, FIG. 5 shows the process steps undertaken at adapter B on receipt of the Exclusive Access Request from adapter A. The process starts at step 600 and proceeds to step 602 where adapter B receives the Exclusive Access Request via the serial link and Peer to Peer communication facility. At step 604, the RAID5 service sets the 'Partner Requesting Lock' flag in the Stripe Control Block for the affected region. At step 606, adapter B completes all ongoing work to the affected region (as specified in I/O processes field of SCB) and at step 608 discards all the cache data (held in DRAM) associated with the region (as identified in Cache Information field of the SCB)

At step 610, the RAID5 service establishes a nonvolatile record of the region in NVRAM (parity in doubt) and, at step 612, sends an Access Grant message to adapter A via the Peer to Peer communications facility and SIC (on receipt of which message adapter A follows step 510 et seq. as indicated in FIG. 4). At step 614, the RAID5 service resets the 'Partner Requesting Lock' flag and sets the 'Locked to Partner' flag in the SCB.

It will be appreciated that in the event of failure of adapter A during write operations, adapter B has sufficient knowledge to enable it to repair the parity which might have been disrupted by adapter A In the event of a power failure, either adapter has access to a non-volatile record which will enable it to restore correct parity to the array, even in the absence of the other adapter.

Subsequently, when the completion message (sent at step 520 of FIG. 4) is received from adapter A, the 'Locked to Partner' flag is reset in the SCB of adapter B SCB to restore the region to its default state (step 616) and the nonvolatile record in NVRAM is cleared (step 618). The process of FIG. 5 ends at step 620.

In the process of FIG. 4 it is assumed that adapter A is able to complete all write operations (step 514) to the affected region without interruption. According to the preferred embodiment, adapter B is allowed to request exclusive access to a region even while adapter A has exclusive access. FIG. 6 shows the process steps undertaken at adapter A in the event that it receives an exclusive access request from adapter B while it is still performing the write operations. In this event (step 700), the process continues at step 702 where the 'Partner Requesting Lock' flag is set in the SCB to inhibit further work to the region and at step 704, where ongoing work to the affected region is completed. At step 706, the 'Locked' flag is reset and at step 708, the cache data associated with the affected region is discarded from DRAM. At step 710 a completion message is sent to adapter B and at step 712 an Exclusive Access Grant is sent to adapter B. Finally, the 'Partner Requesting Lock' flag is reset and the 'Locked to Partner' flag is set at step 714. The process of FIG. 6 ends at step 716.

Figure 7:
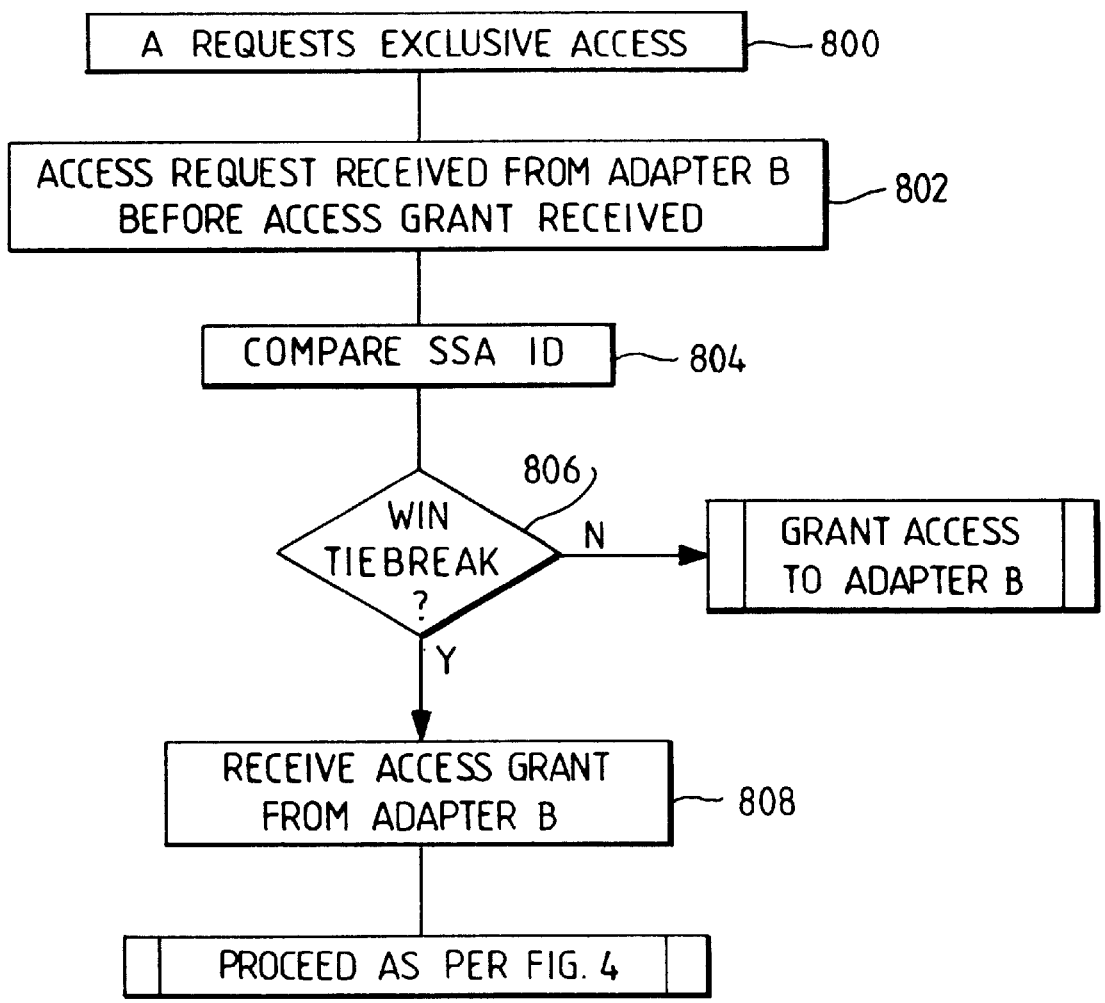
FIG. 7 is a flow chart showing the process steps involved in the event of simultaneous exclusive access requests from the adapters of FIG. 1.

In the event that adapters A and B both issue requests simultaneously, a tie-break decision is required. This must use some information known to both so that both adapters decide which should have access first. The loser of the tie-break grants exclusive access to the winner. This process is shown in FIG. 7 from the perspective of adapter A. At step 800, adapter A sends an Exclusive Access Request to adapter B. If, at step 802, adapter A receives an Exclusive Access Request from adapter B before receiving an Exclusive Access Grant from adapter B, then a tie-break is required. In the present embodiment employing the SSA architecture, the tie break decision is made by comparing the respective SSA IDs of the two adapters (step 804). The SSA IDs are set on initialisation of the SSA network and in subsequent communications, each adapter identifies itself with its SSA ID. In the present embodiment, if adapter A has a higher SSA ID than adapter B, then it wins the tiebreak at step 806. Adapter A subsequently receives an Exclusive Access Grant message from adapter B at step 808 and the process proceeds as per FIG. 4. If adapter A loses the tiebreak, then it grants Exclusive Access to adapter B as per FIG. 5. On losing the tiebreak, adapter A also ensures that any cached data, read as part of the processing for the write (for example read operations for RAID 5 write), is discarded before granting to the winner.

It will be appreciated that the tiebreak decision in non-SSA environments will be based on different parameters. For instance in FC-AL, the tiebreak may be based on the Worldwide Name of the Fiber Channel Array Controller.

Although the present invention has been described in accordance with the embodiment shown, one of ordinary skill in the art will readily recognise that there could be variations to the embodiment and those variations would be within the spirit and scope of the present invention as defined by the appended claims. In particular, although the preferred embodiment employs only two adapters, the invention is equally applicable to networks in which more than two adapters have access to shared data.

Accordingly, it is to be understood that the invention disclosed herein is not to be limited by the illustrated embodiment, but only by the scope of the appended claims.

What is claimed is:

1. In a data processing network including a plurality of array controllers connected for communication to each other and a plurality of data storage devices, a method for coordinating exclusive access by the plurality of controllers to a shared data region on said plurality of data storage devices comprising the steps of:

for each write operation to the shared data region, sending an exclusive access request from a controller desiring such access to all controllers having access to the shared data region;

as part of granting exclusive access to the requesting controller, each receiving controller carrying out the steps of:

completing ongoing work to the shared data region;

discarding cache data associated with the shared data region;

establishing a non-volatile record for the shared data region prior to granting exclusive access to the requesting controller;

inhibiting further access to the shared data region; and sending an exclusive access grant to the requesting controller.

2. The method as set forth in claim 1, wherein the write operation is a RAID-5 write and the step of storing the non-volatile record comprises storing an indication that parity is in doubt for the shared data region.

3. The method as set forth in claim 1 wherein the shared data region comprises a RAID-5 stripe made up of data strips and a parity strip on the data storage devices.

4. In a data processing network including a plurality of array controllers connected for communication to each other and a plurality of data storage devices, a method for coordinating exclusive write access by the plurality of controllers to a shared data region on said plurality of data storage devices comprising the steps of:

at a first array controller, broadcasting an exclusive access request to all other array controllers having access to the shared data region and storing a non-volatile record of the write operation in the first array controller; and at each controller receiving the exclusive access request, carrying out the steps of:

completing ongoing work to the shared data region;

discarding cache data associated with the shared data region;

storing a non-volatile record for the shared data region prior to sending an exclusive access grant to the first array controller;

inhibiting further access to the shared data region; and
sending an exclusive access grant to the first array controller.

5. The method as set forth in claim 4 wherein the first array controller requires exclusive access in order to perform a RAID 5 write operation, the method comprising the further step of:
at the first array controller, performing the read operations to the shared data region prior to receiving the exclusive access grant from the other array controllers.

6. The method as set forth in claim 4 wherein if the first controller receives an exclusive access request from another controller prior to receiving an exclusive access grant, the method comprising the further step of performing a tie-break operation to determine which controller should have exclusive access to the shared data region.

7. The method as set forth in claim 6 wherein each array controller is an adapter in an SSA network and the tie-break determination is based on the SSA IDs of the adapters.

8. An array controller for use in a network including a plurality of array controllers connected for communication to each other and to a plurality of data storage devices, the array controller including means for coordinating exclusive write access to a shared data region on said plurality of data storage devices, the coordinating means comprising:
means, responsive to a request to perform write operation (s) to the shared data region, for:
sending an exclusive access request to the other controllers on the network; and
responsive to an exclusive access grant from the other controllers on the network to perform the write operation(s);
means, responsive to an exclusive access request to the shared data region from another controller, for:
completing ongoing work to the shared data region;
discarding cache data associated with the shared data region;
storing a non-volatile record for the shared data region prior to granting the exclusive access request;
inhibiting further access to the shared data region; and
sending an exclusive access grant to said another controller.

9. A computer program product comprising a computer readable medium having tangibly embodied thereon computer program code means for coordinating exclusive access to a shared data region on a plurality of data storage devices in a network including a plurality of array controllers connected for communication to each other and to the plurality of data storage devices, the computer program code means including:
computer program code means, executable on an array controller and responsive to a request to perform specified write operation(s) to the shared data region, for:
sending an exclusive access request to the other controllers on the network; and
responsive to an exclusive access grant from the other controllers on the network, to perform the specified write operation(s);
computer program code means, executable on the array controller and responsive to receiving an exclusive access request to the shared data region from another controller, for:
completing ongoing work to the shared data region;
discarding cache data associated with the shared data;
storing a non-volatile record for the shared data region;
inhibiting further access to the shared data;
sending an exclusive access grant to said another controller.

* * * * *